United States Patent
Atas et al.

(10) Patent No.: US 11,786,829 B2
(45) Date of Patent: Oct. 17, 2023

(54) BRAKING SYSTEM FOR SLIDEWAY GUIDED AMUSEMENT VEHICLES

(71) Applicant: POLIN SU PARKLARI VE HAVUZ SISTEMLERI ANONIM SIRKETI, Kocaeli (TR)

(72) Inventors: Tarik Atas, Kocaeli (TR); Ali Cansun, Kocaeli (TR); Serein Basut, Kocaeli (TR)

(73) Assignee: POLIN SU PARKLARI VE HAVUZ SISTEMLERI ANONIM SIRKETI, Kocaeli (TR)

( * ) Notice: Subject to any disclaimer, the term of this patent is extended or adjusted under 35 U.S.C. 154(b) by 345 days.

(21) Appl. No.: 17/288,621

(22) PCT Filed: Oct. 26, 2018

(86) PCT No.: PCT/TR2018/050629
§ 371 (c)(1),
(2) Date: Apr. 26, 2021

(87) PCT Pub. No.: WO2020/086011
PCT Pub. Date: Apr. 30, 2020

(65) Prior Publication Data
US 2021/0394074 A1 Dec. 23, 2021

(51) Int. Cl.
*A63G 21/04* (2006.01)
*A63G 21/02* (2006.01)
(Continued)

(52) U.S. Cl.
CPC ............. *A63G 21/04* (2013.01); *A63G 21/02* (2013.01); *B60T 7/126* (2013.01); *B60T 7/22* (2013.01);
(Continued)

(58) Field of Classification Search
CPC .......... A63G 21/04; A63G 21/02; A63G 7/00; B60T 7/126; B60T 7/22; B60T 2201/022;
(Continued)

(56) References Cited

U.S. PATENT DOCUMENTS

| 1,783,268 A | 12/1930 | Traver |
| 1,852,384 A * | 4/1932 | Wallin .................... A63G 7/00 104/69 |

(Continued)

FOREIGN PATENT DOCUMENTS

WO 03043865 A1 5/2003

*Primary Examiner* — Xuan Lan Nguyen
(74) *Attorney, Agent, or Firm* — Bayramoglu Law Offices LLC

(57) ABSTRACT

A braking system for slideway guided amusement vehicles providing both manual and automatic braking for the slideway guided amusement vehicles is provided. The braking system includes at least one brake handle, a first shaft fixed to the at least one brake handle, a first gear concentrically positioned on and free to spin independently of the first shaft, an actuator fixed to the first shaft for providing a linear motion to a stop pin, an inlet opening on the first gear for receiving the stop pin, a second gear coupled to the first gear, concentrically fixed on a second shaft for mounting spinnably and extending horizontally to a chassis of a vehicle, at least one friction member attached to the second shaft, a tensioning means, and a control unit adapted to remove the stop pin from the inlet opening via the actuator.

11 Claims, 13 Drawing Sheets

(51) Int. Cl.
*B60T 7/12* (2006.01)
*B60T 7/22* (2006.01)
*B61H 7/06* (2006.01)
*B61H 11/02* (2006.01)
*B61H 13/00* (2006.01)
*B61H 13/02* (2006.01)
*B61H 13/20* (2006.01)
*F16D 59/00* (2006.01)
*F16D 63/00* (2006.01)
*F16D 65/28* (2006.01)
*A63G 7/00* (2006.01)
*F16D 121/16* (2012.01)

(52) U.S. Cl.
CPC ............... *B61H 7/06* (2013.01); *B61H 11/02* (2013.01); *B61H 13/005* (2013.01); *B61H 13/02* (2013.01); *B61H 13/20* (2013.01); *F16D 59/00* (2013.01); *F16D 63/008* (2013.01); *F16D 65/28* (2013.01); *A63G 7/00* (2013.01); *B60T 2201/022* (2013.01); *F16D 2121/16* (2013.01)

(58) Field of Classification Search
CPC ........ B61H 7/06; B61H 11/02; B61H 13/005; B61H 13/02; B61H 13/20; F16D 59/00; F16D 63/008; F16D 65/28; F16D 2121/16
See application file for complete search history.

(56) References Cited

U.S. PATENT DOCUMENTS

| | | | | |
|---|---|---|---|---|
| 3,970,300 | A | * 7/1976 | von Wendt | A63G 21/04 248/354.3 |
| 4,221,170 | A | * 9/1980 | Koudelka | A63G 21/04 104/69 |
| 4,236,454 | A | * 12/1980 | Erickson | A63G 7/00 104/246 |
| 4,246,846 | A | * 1/1981 | Betschart | A63G 21/04 188/42 |
| 4,934,277 | A | 6/1990 | Smith et al. | |
| 2003/0066453 | A1 | 4/2003 | Cylvick | |

* cited by examiner

> US 11,786,829 B2

BRAKING SYSTEM FOR SLIDEWAY GUIDED AMUSEMENT VEHICLES

CROSS REFERENCE TO THE RELATED APPLICATIONS

This application is the national stage entry of International Application No. PCT/TR2018/050629, filed on Oct. 28, 2018, the entire contents of which are incorporated herein by reference.

TECHNICAL FIELD

The present invention relates to a braking system for slideway guided amusement vehicles, specifically a braking system providing both manual and automatic braking for slideway guided amusement vehicles.

BACKGROUND

Slideway guided amusement vehicles such as alpine/mountain coasters, alpine slides, summer toboggan runs roll by use of gravity over a smooth slideway generally made by concrete, metal such as stainless steel or fiberglass in a form of concave roadway or railway. Under the gravitational acceleration the vehicles reach considerable speeds making trip dangerous without any brake control. Thus, the vehicles have a braking system which utilizes mechanical forces like friction force or electromagnetic forces generally utilize eddy current where the braking is under control by riders (vehicle drivers). However, giving sole initiative to riders for braking may cause severe accidents. Therefore, the vehicles should also have an automatic braking system.

Present invention provides both manual and automatic braking for slideway guided amusement vehicles.

BRIEF DESCRIPTION OF THE DRAWINGS

An exemplary embodiment of the present invention is illustrated by way of example in the accompanying drawings to be more easily understood and uses thereof will be more clear when considered in view of the detailed description, in which like reference numbers indicate the same or similar elements, and the following figures in which.

Figure 1:
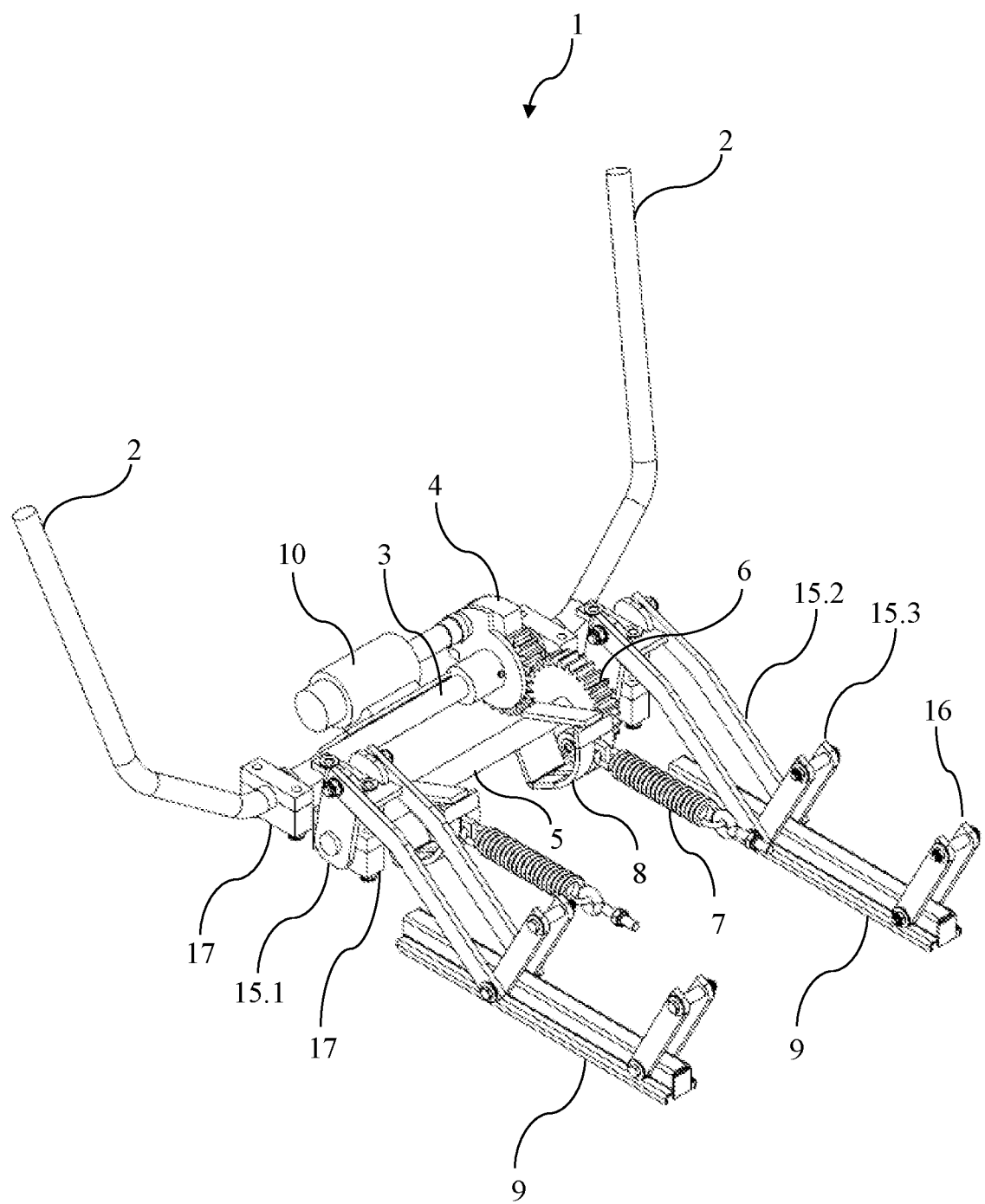
FIG. 1 is a perspective view of braking system for slideway guided amusement vehicles in one exemplary embodiment of the present invention.
Figure 2:
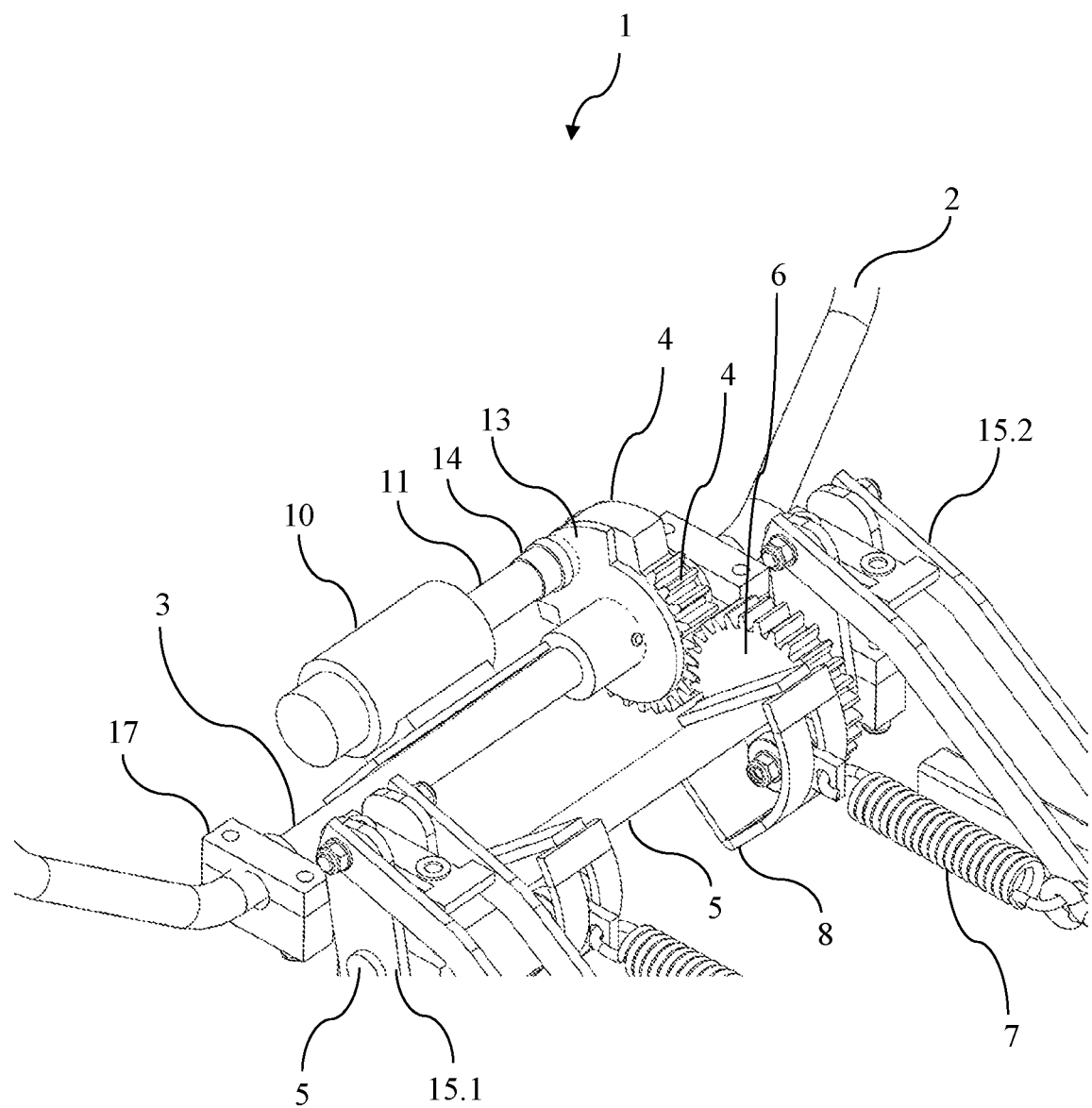
FIG. 2 is a perspective, detailed view of braking system for slideway guided amusement vehicles in one exemplary embodiment of the present invention.
Figure 3:
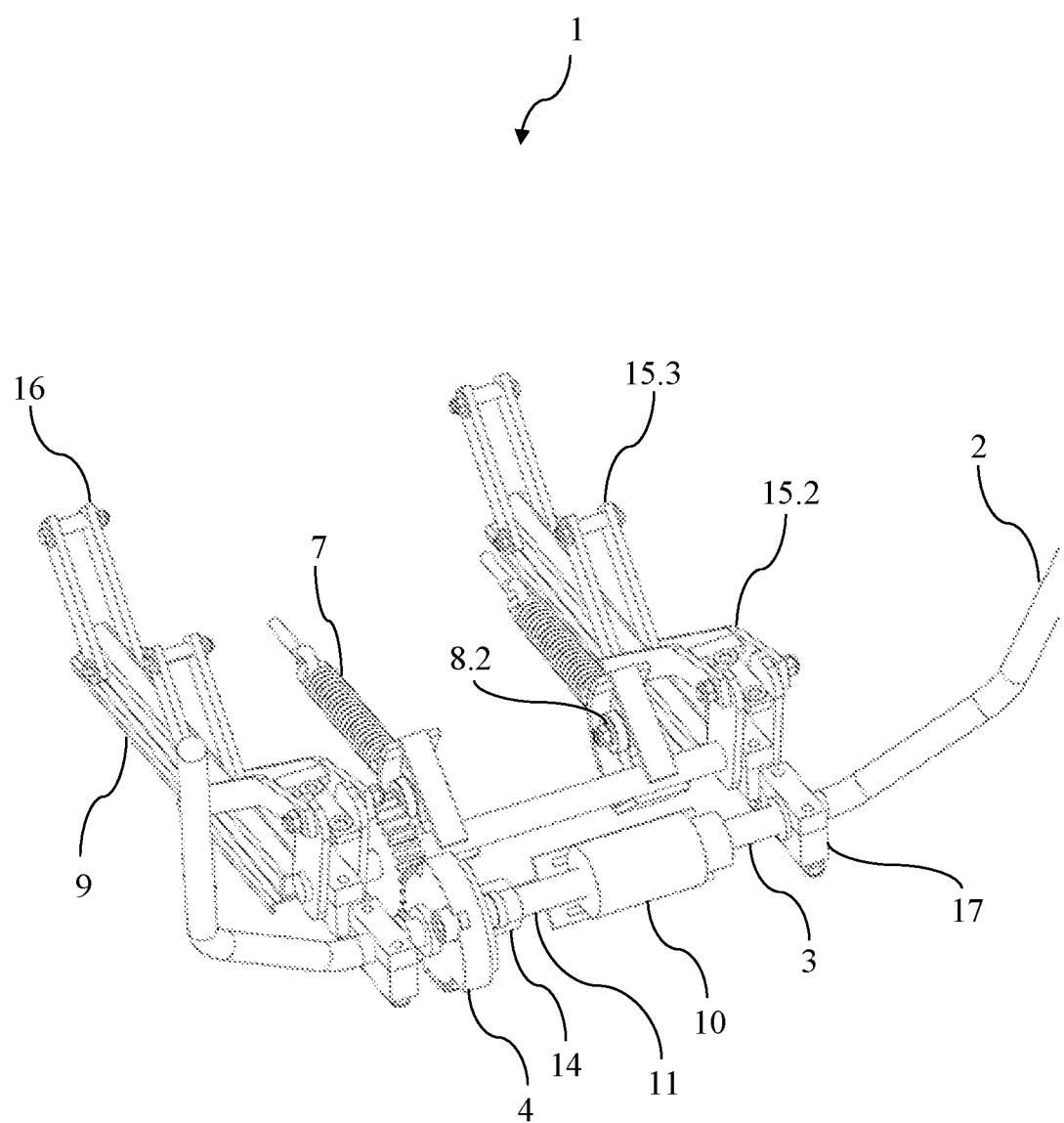
FIG. 3 is a perspective view in reverse angle of braking system for slideway guided amusement vehicles in one exemplary embodiment of the present invention.
Figure 4:
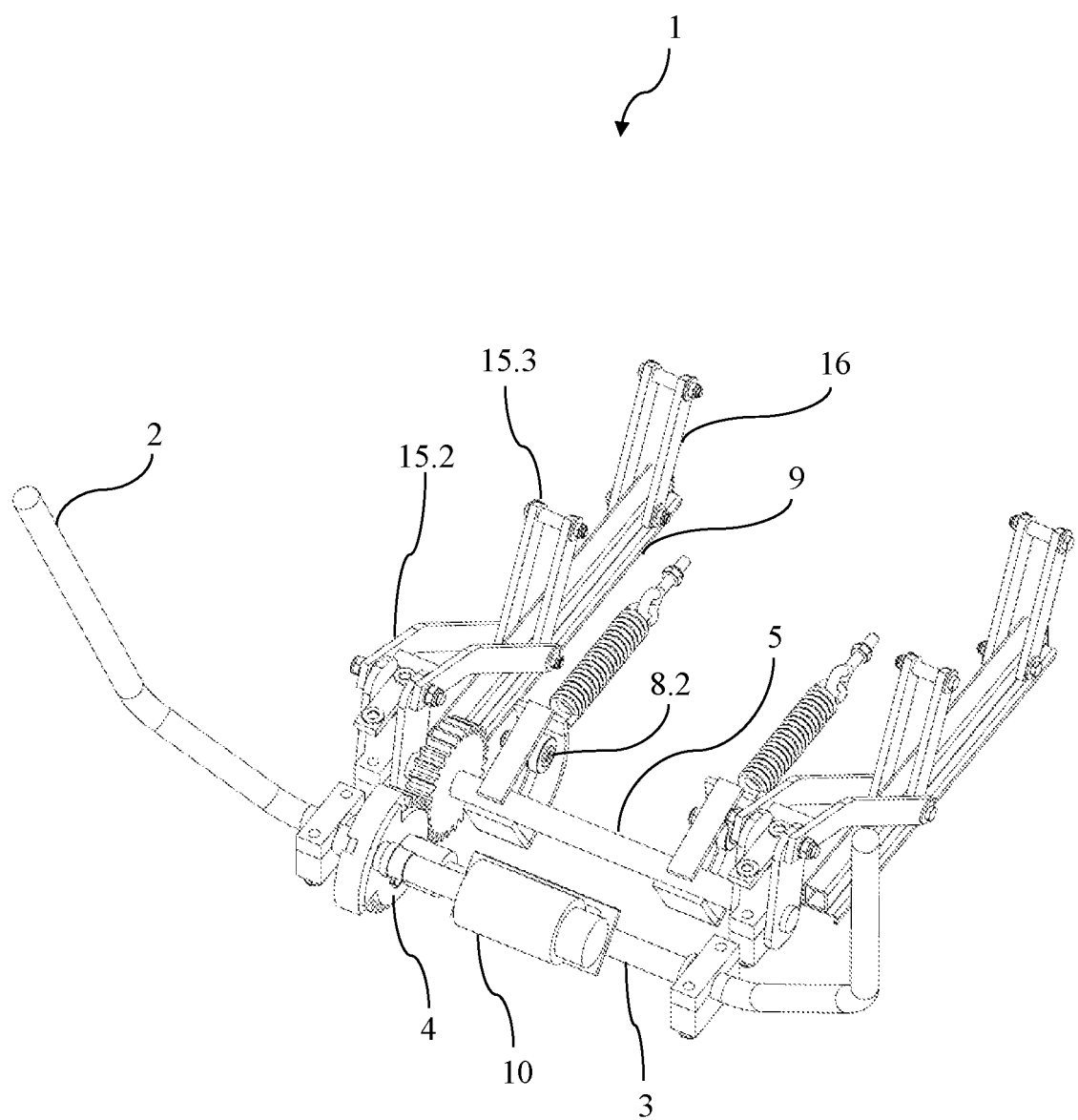
FIG. 4 is another perspective view of braking system for slideway guided amusement vehicles in one exemplary embodiment of the present invention.
Figure 5:
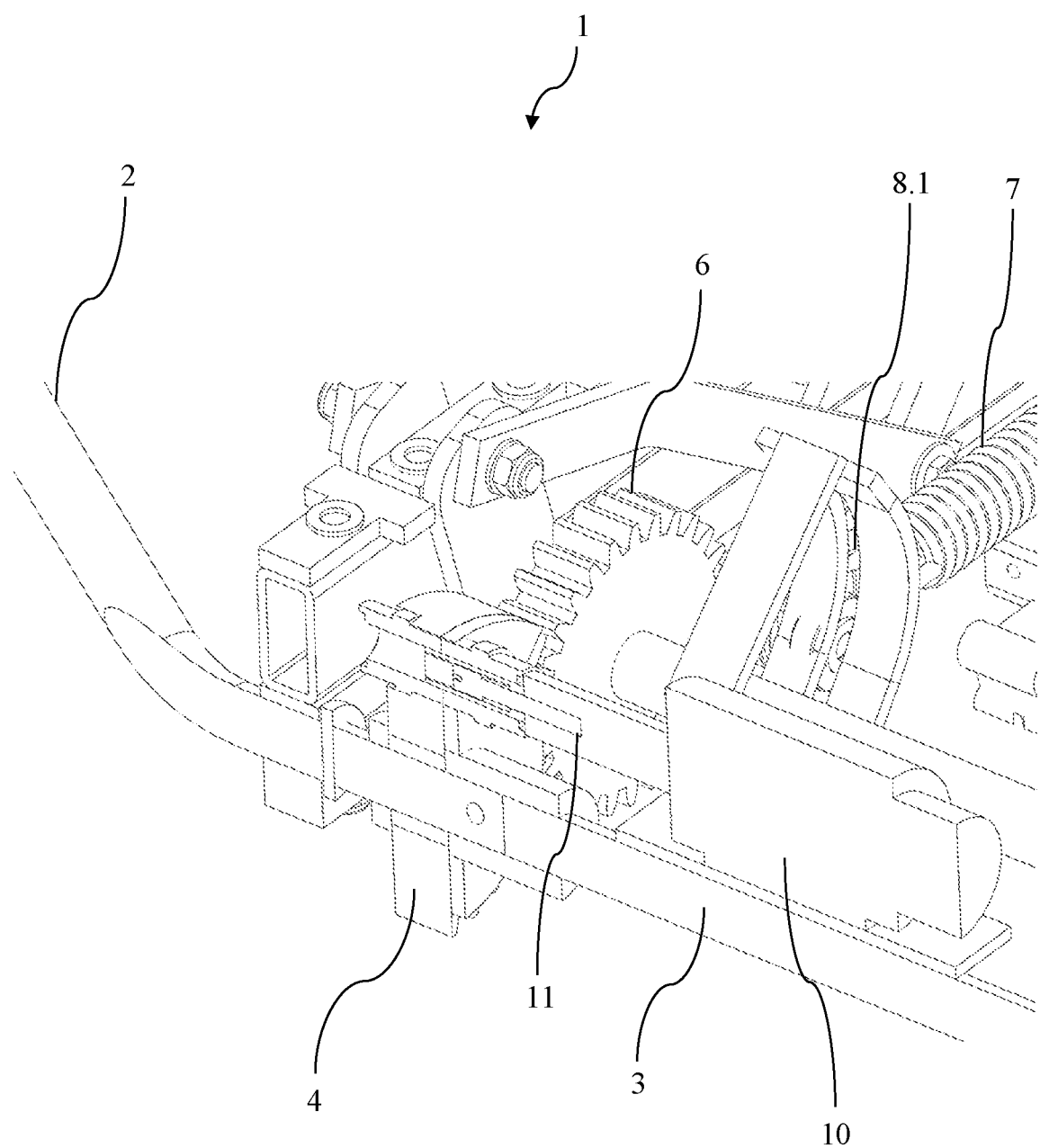
FIG. 5 is a cutaway view of first gear, stop pin and actuator in one exemplary embodiment of the present invention (the wheel is not attached to the other end of the tensioning means (7) so the wheel is not situated inside the tensioner block for clearer illustration of the slit).
Figure 6:
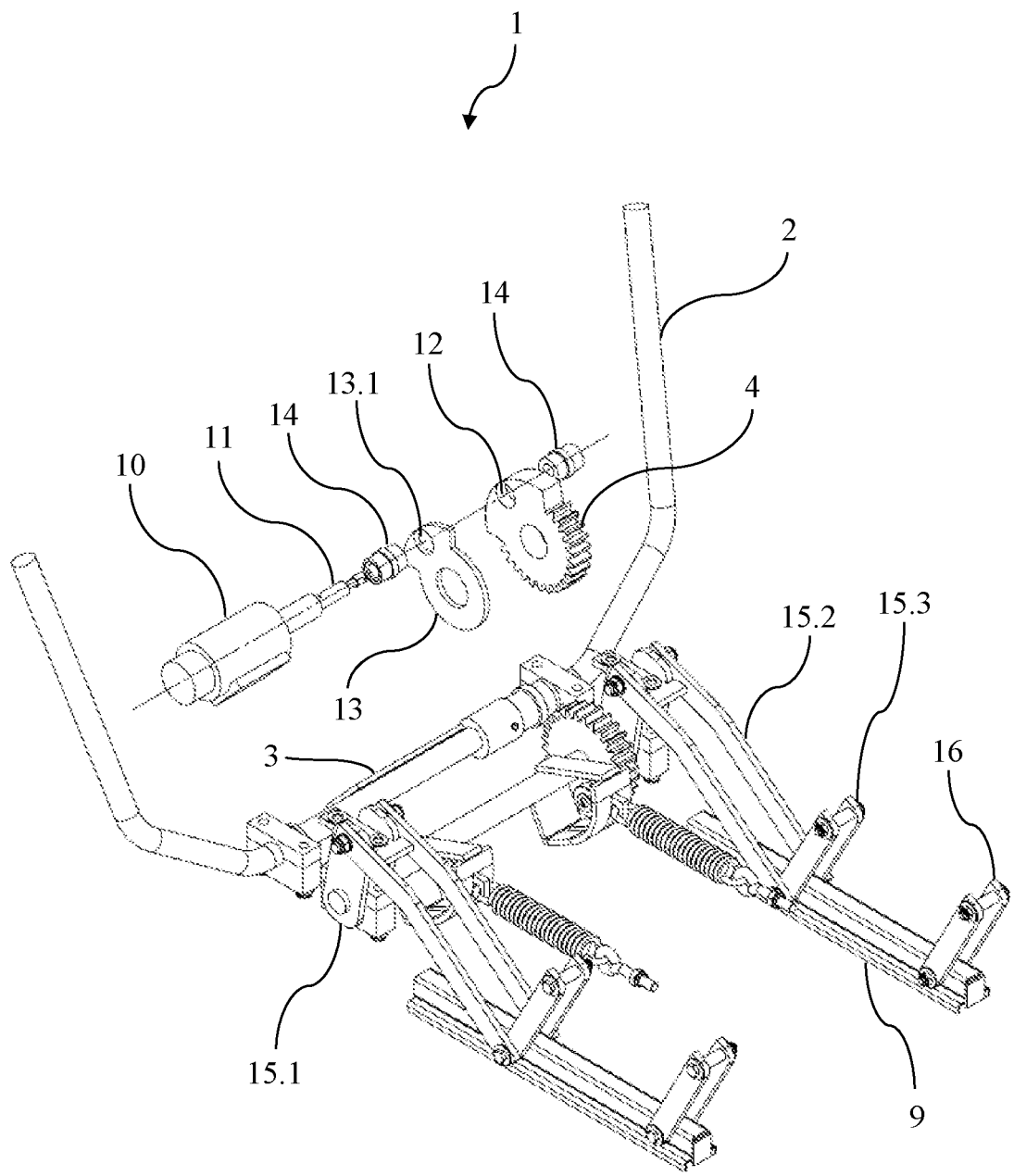
FIG. 6 is a perspective view of braking system for slideway guided amusement vehicles comprising an exploded view of actuator, stop pin, ball bush, support means and first gear in one exemplary embodiment of the present invention.
Figure 7:
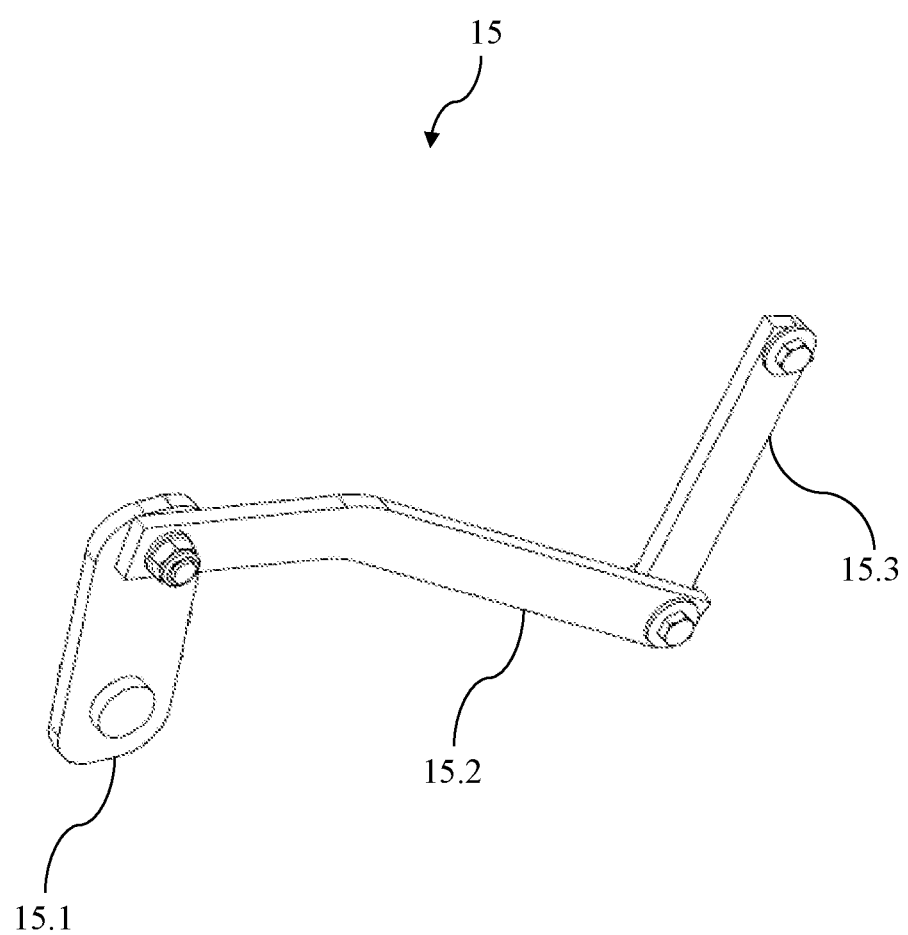
FIG. 7 is a perspective view of four-bar mechanism in one exemplary embodiment of the present invention.
Figure 8:
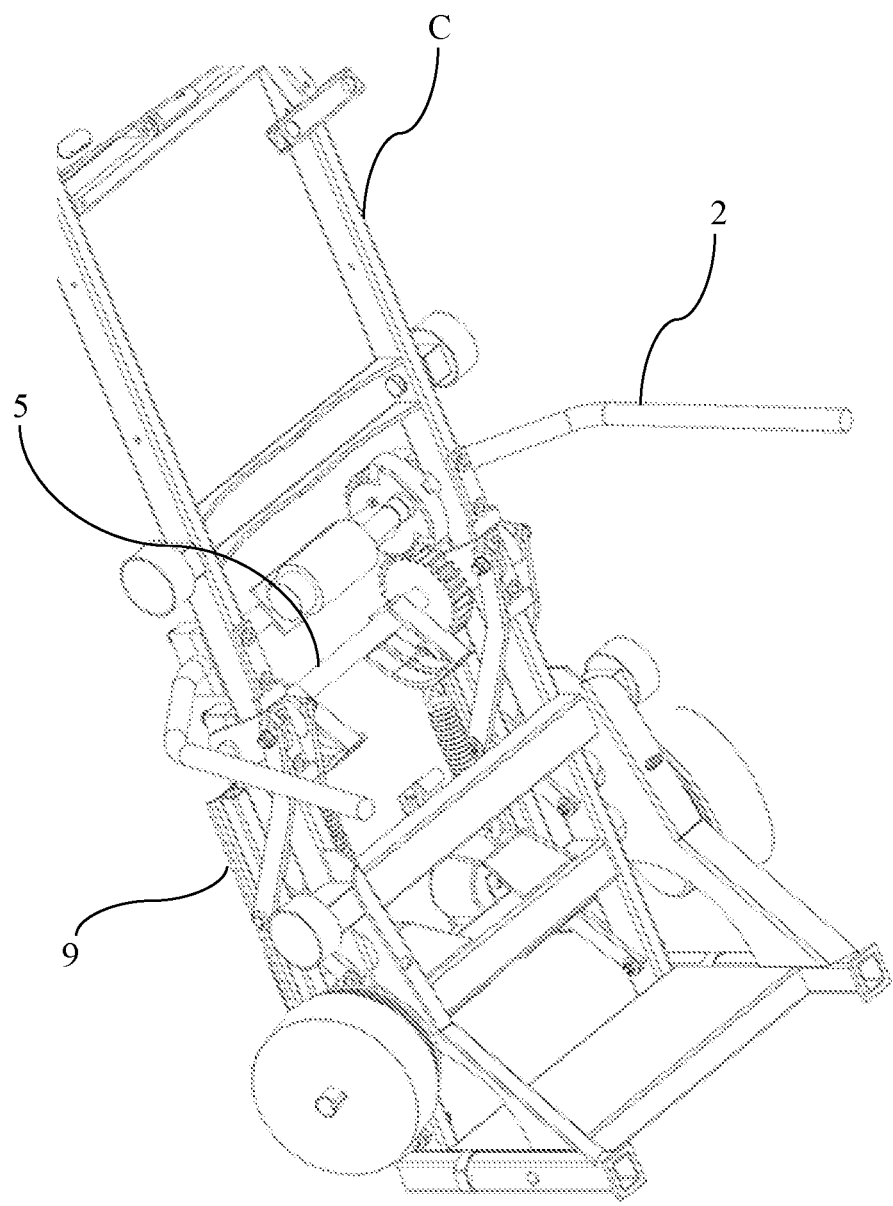
FIG. 8 is a perspective view of braking system for slideway guided amusement vehicles mounted on chassis of a vehicle in one exemplary embodiment of the present invention (the wheel is not attached to the other end of the tensioning means (7) so the wheel is not situated inside the tensioner block for clearer illustration of the slit).
Figure 9:
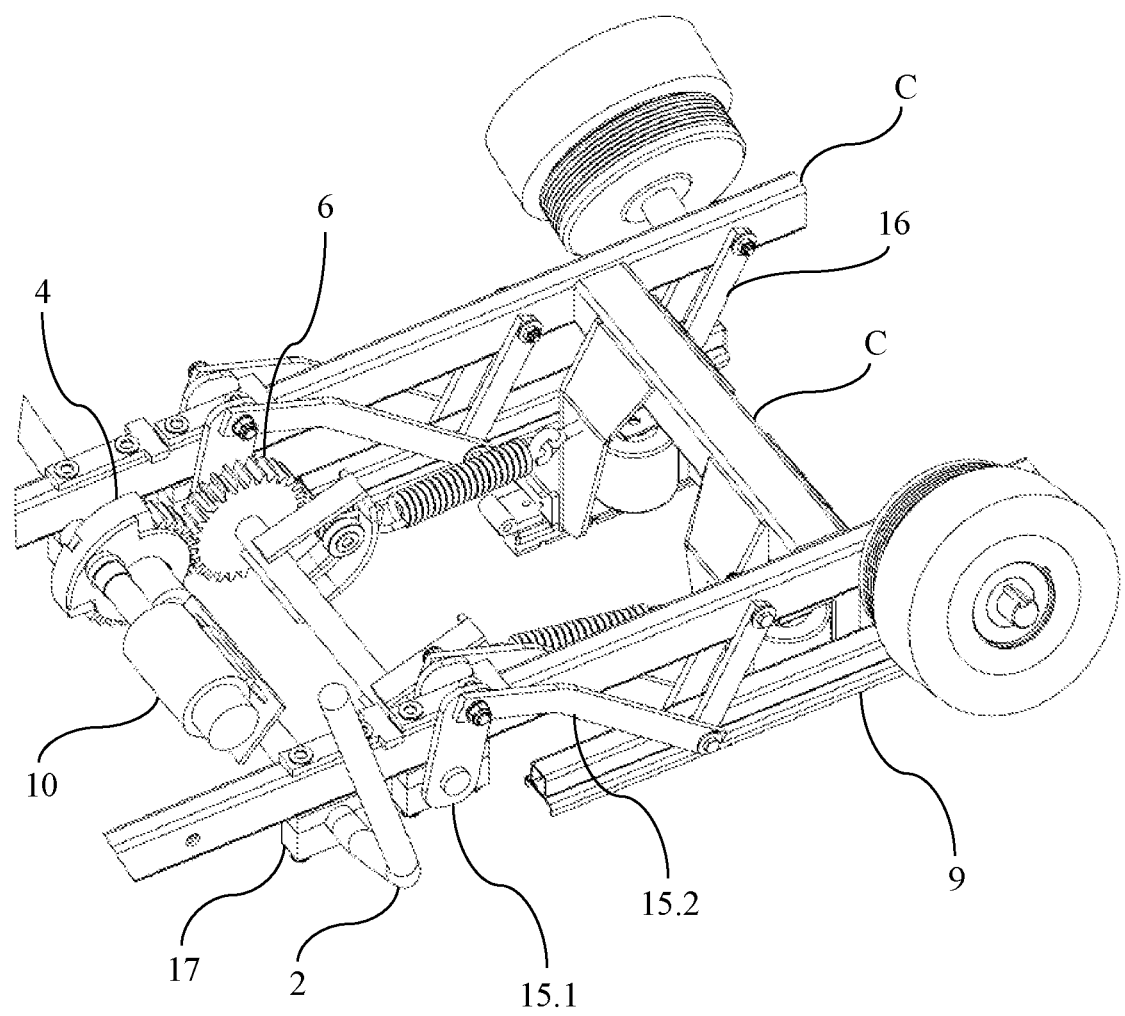
FIG. 9 is a perspective view of braking system for slideway guided amusement vehicles mounted on chassis of a vehicle where the break handle is release and the second shaft is in the breaking position in one exemplary embodiment of the present invention.
Figure 10:
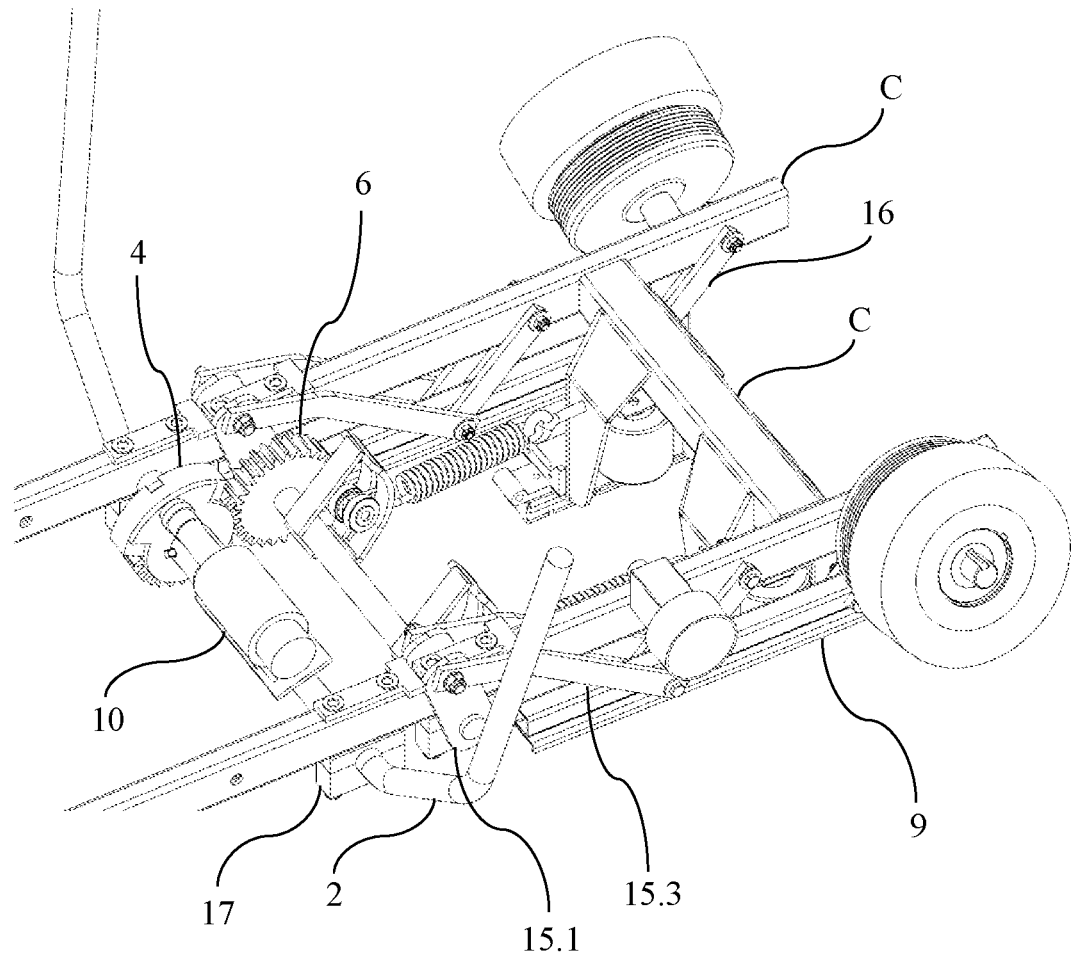
FIG. 10 is a perspective view of braking system for slideway guided amusement vehicles mounted on chassis of a vehicle where the break handle is pulled and the second shaft is out of the breaking position in one exemplary embodiment of the present invention.
Figure 11:
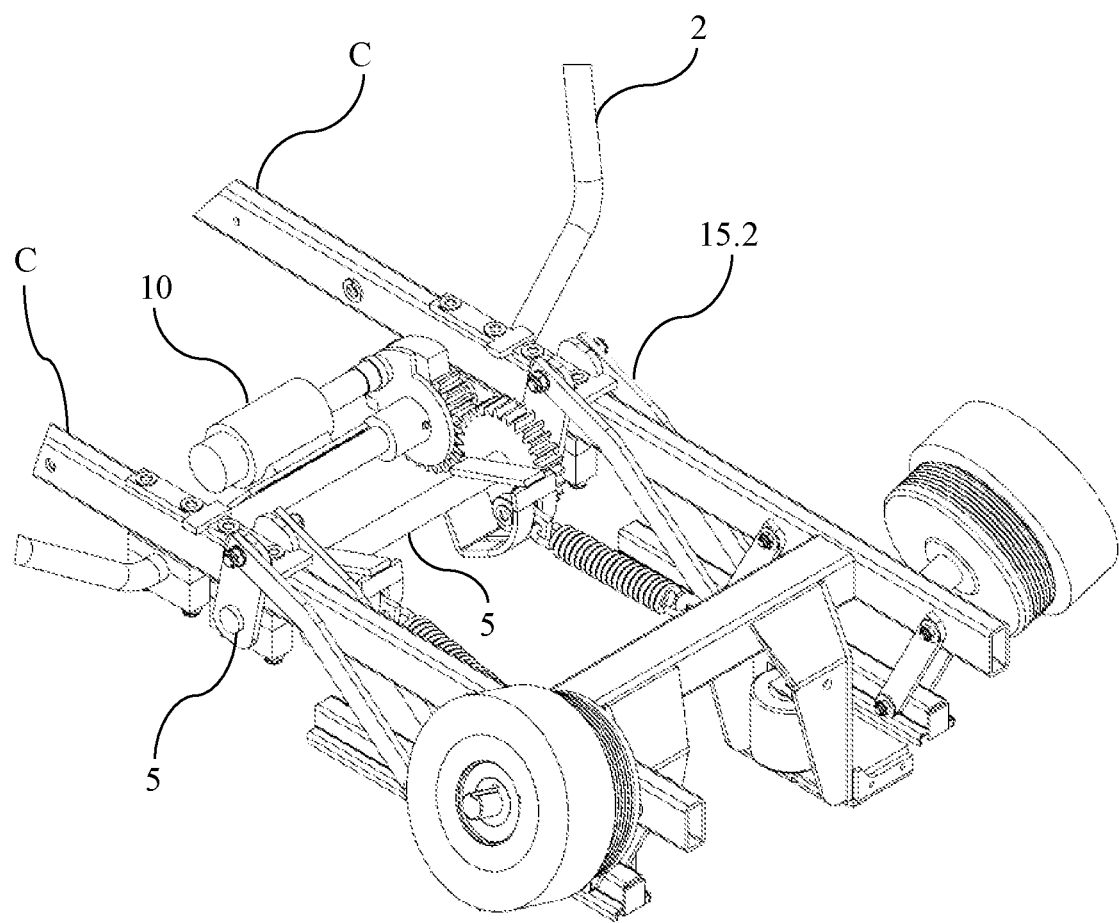
FIG. 11 is another perspective view in different angle of braking system for slideway guided amusement vehicles mounted on chassis of a vehicle in one exemplary embodiment of the present invention.
Figure 12:
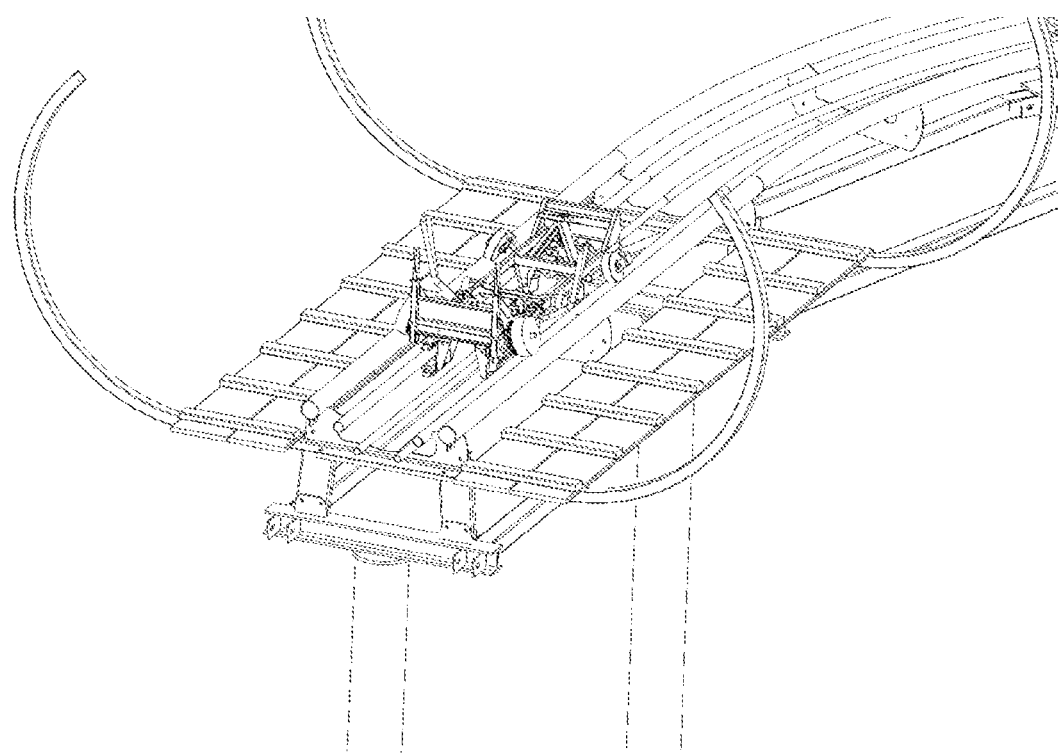
FIG. 12 is a perspective view of a vehicle on slideway to which braking system is mounted in one exemplary embodiment of the present invention.
Figure 13:
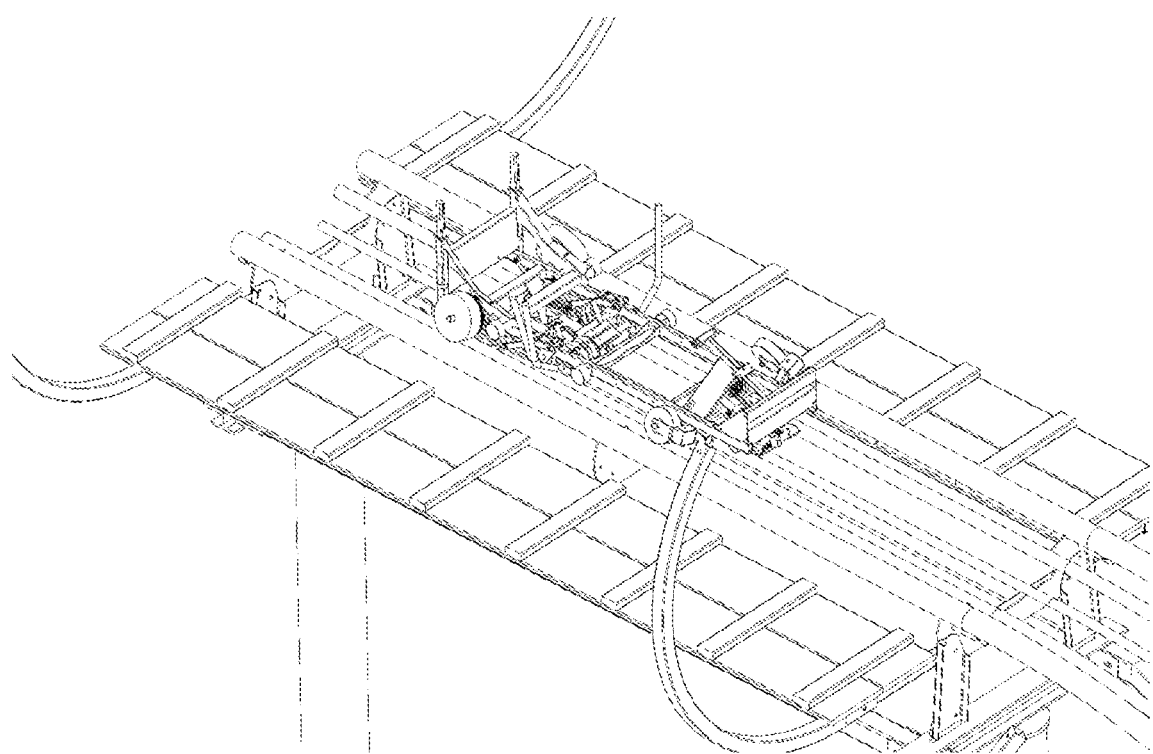
FIG. 13 is another perspective view of a vehicle on slideway to which braking system is mounted in one exemplary embodiment of the present invention.

The elements illustrated in the figures are numbered as follows:
1. Braking system
2. Brake handle
3. First shaft
4. First gear
5. Second shaft
6. Second gear
7. Tensioning means
8. Tensioner block
8.1. Slit
8.2. Wheel
9. Friction member
10. Actuator
11. Stop pin
12. Inlet opening
13. Support means
13.1. Collar hole
14. Ball bush
15. Four-bar mechanism
15.1. Crank
15.2. Coupler
15.3. Rocker
16. Bracket
17. Pillow block bearings
C. Chassis

DETAILED DESCRIPTION OF THE EMBODIMENTS

Embodiments of the present invention relates to a braking system (1) for slideway guided amusement vehicles comprising at least one brake handle (2); a first shaft (3) fixed to the brake handle (2) for mounting spinnably and extending horizontally to chassis (C) of a vehicle where when the brake handle (2) is pushed or pulled from its released position, the brake handle (2) provides a torque on the first shaft (3); a first gear (4) concentrically positioned on and free to spin independently of the first shaft (3); an actuator (10) fixed to the first shaft (3) for providing a linear motion to a stop pin (11); an inlet opening (12) on the first gear (4) for receiving the stop pin (11) by which first gear (4) rotates with first shaft (3) when the stop pin (11) is in the inlet opening (12); a second gear (6) coupled to the first gear (4), concentrically fixed on a second shaft (5) for mounting spinnably and extending horizontally to chassis (C) of the vehicle; at least one friction member (9) attached to the second shaft (5) for applying braking force to a slideway when the second shaft (5) is in a braking position; a tensioning means (7) one end of which is for anchoring to chassis (C) of the vehicle, other end of which attached to a tensioner block (8) fixed to the second shaft (5) where the tensioning means (7) apply a force to the second shaft (5) through tensioner block (8) to keep the second shaft (5) in the braking position; a control unit adapted to remove the stop pin (11) from the inlet opening (12) via the actuator (10) when the control unit receives a braking signal from at least one electronic unit connected to itself.

When the stop pin (11) is in the inlet opening (12) and when the brake handle (2) is pulled or pushed from its released position, the rotational movement of the first shaft (3) is transmitted to the second shaft (5) though the first gear (4) and second gear (6) which moves the tensioner block (8) to increase tension on the tensioning means (7) and spins the second shaft (5) out of the braking position where friction member (9) is released from the slideway for making the vehicle free to move.

When the brake handle (2) is released, the second shaft (5) is spun to its braking position again via released tension on the tensioning means (7) and friction member (9) starts to apply braking force to the slideway.

If the control unit receives the braking signal from the electronic unit, the stop pin (11) is removed from the inlet opening (12) via the actuator (10) whereby the first gear (4) spins free from the first shaft (3) thus the second gear (6) and second shaft (5) spins to the braking position and friction member (9) starts to apply braking force to the slideway independent from pulling or pushing or releasing of the brake handle (2).

In more detailed description, when the stop pin (11) is in the inlet opening (12) and when the brake handle (2) is pulled or pushed from its released position, the movement of the brake handle (2) provides a torque on the first shaft (3). The first shaft (3) spins (be subject to a rotational movement). Since the stop pin (11) is situated in the inlet opening (12), the first gear (4) rotates with the first shaft (3). The rotational movement of the first gear (4) is transmitted to the second gear (6) which is coupled to first gear (4). Since the second gear (6) is concentrically fixed on the second shaft (5), the second shaft (5) rotates with the second gear (6). In rotated position of the second shaft (5) [in other words the second shaft (5) is out of the braking position], the friction member (9) attached to the second shaft (5) is released by being pulled or pushed from the slideway so that the vehicle moves. On the one hand, rotation of the second shaft (5) moves the tensioner block (8) against the tensioning means (7) which increases tension on the tensioning means (7) helping to move the second shaft (5) in the braking position when the brake handle (2) is released or the stop pin (11) is removed from the inlet opening (12).

When the brake handle (2) is released, tension on the tensioning means (7) moves (push or pull) the tensioner block (8). The movement of the tensioner block (8) rotates back the second shaft (5) into its braking position thus the friction member (9) starts to apply braking force to the slideway again. Since the second shaft (5) is concentrically fixed to the second gear (6), the second gear (6) rotates with the second shaft (5). The rotational movement of the second gear (6) is transmitted to the first gear (4) which is coupled to second gear (6). Since the stop pin (11) is situated in the inlet opening (12), the first shaft (3) rotates with the first gear (4). The brake handle (2) fixed to first shaft (3) moves into its breaking position.

When the brake handle (2) is in the released position [which means that the friction member (9) is applying braking force to the slideway] and if the control unit receives the braking signal from the electronic unit, the stop pin (11) is removed from the inlet opening (12) via the actuator (10). Since the second shaft (5) is already in the its breaking position, there will be no action (movement) in the braking system (1) where the friction member (9) keeps applying braking force to the slideway.

When the brake handle (2) isn't in the pulled or pushed position [which means that the second shaft (5) is out of its breaking position and the friction member (9) doesn't apply braking force to the slideway] and if the control unit receives the braking signal from the electronic unit, the stop pin (11) is removed from the inlet opening (12) via the actuator (10). Since the first gear (4) is situated as to be free to spin independently of the first shaft (3), the connection between the first gear (4) and the first shaft (3) is lost and co-rotational movement of them ends. Thus, the counterforce applied by the pulled/pushed brake handle (2) balancing the tension on the tensioning means (7) is disappeared. As a result, even if the rider pulls or pushes the brake handle (2), the second shaft (5) is spun into its breaking position and so the friction member (9) starts to apply braking force to the slideway again. [Tension on the tensioning means (7) moves the tensioner block (8). The movement of the tensioner block (8) rotates back the second shaft (5) into its breaking position thus the friction member (9) starts to apply braking force to the slideway again. Since the second shaft (5) is concentrically fixed to the second gear (6), the second gear (6) rotates with the second shaft (5). The rotational movement of the second gear (6) is transmitted to the first gear (4) which is coupled to second gear (6). Since the stop pin (11) is removed from the inlet opening (12), the first gear (4) is spun freely from the first shaft (3) and the brake handle (2). There is no rotation/movement on the first shaft (3) and the brake handle (2).]

In one embodiment of the braking system (1) for slideway guided amusement vehicles which is applicable for all embodiments, the electronic unit is preferably a proximity sensor sending the braking signal to the control unit when it detects presence of a vehicle in front at a selected distance. As a result, crashing into a vehicle in front is prevented.

In one embodiment of the braking system (1) for slideway guided amusement vehicles which is applicable for all embodiments, the electronic unit is preferably a speed sensor sending the braking signal to the control unit when the vehicle exceeds a selected speed limit. As a result, going off the slideway is prevented.

In one embodiment of the braking system (1) for slideway guided amusement vehicles which is applicable for all embodiments, the electronic unit is preferably a wireless receiver sending the braking signal to the control unit when it receives a trigger signal wirelessly. The wireless trigger signal may be transmitted from a control room/cabin. Alternatively, the wireless trigger signal may be transmitted from a transmitter transmitting the braking signal when the braking system (1) [accordingly the vehicle] enters a selected zone on the slideway.

In one embodiment of the braking system (1) for slideway guided amusement vehicles which is applicable for all embodiments, the tensioning means (7) preferably is a helical/coil spring.

One embodiment of the braking system (1) for slideway guided amusement vehicles which is applicable for all embodiments, preferably comprises a support means (13) with a collar hole (13.1) for the stop pin (11) situated on the first shaft (3), close to the first gear (4), for preventing abaxial movement of the stop pin (11). In this embodiment, preferably, a ball bush (14) situated on the actuator (10) and/or support means (13) and/or the first gear (4) (inside the inlet opening (12)) for providing a linear guideway for the stop pin (11).

In one embodiment of the braking system (1) for slideway guided amusement vehicles which is applicable for all embodiments, the tensioner block (8) preferably has a D shape cross-section from. The linear part of the said tensioner block (8) is fixed to the second shaft (5) from its lower end. Arced part of the said tensioner block (8) has a longitudinal slit (8.1) for receiving the other end [not anchored end] of the tensioning means (7). This embodiment comprises a wheel (8.2) situated inside the tensioner block (8). The wheel (8.2) is attached to the other end of the tensioning means (7). Thus, the other end of the tensioning means (7) is free to move through the slit (8.1) via rolling motion of the wheel (8.2) on an inside surface of the arced part. When the second shaft (5) is in its breaking position, the wheel (8.2) is situated close to the one end of arced part and the linear part lie down horizontally with the tensioning means (7). When the second shaft (5) is spun form its breaking position, the wheel (8.2) rolls to the other end of arced part and the linear part lie down almost parallel with the tensioning means (7) so the tensioning means (7) is pulled and tension on the tensioning means (7) increases. In this embodiment, vertical motion of the tensioning means (7) is prevented and horizontal position of the tensioning means (7) is kept during the rotation of the second gear (6). Thus, maintenance period of the tensioning means (7) is increased. Moreover, since there is no need for a space for vertical motion of the tensioning means (7), a more compact braking system (1) is realized. In this embodiment, the wheel (8.2) is preferably a roller bearing.

In one embodiment of the braking system (1) for slideway guided amusement vehicles which is applicable for all embodiments, the friction member (9) attached to the second shaft (5) preferably via a four-bar mechanism (15). The four-bar mechanism (15) comprises a crank (15.1) fixed to the second shaft (5), a coupler (15.2) pivotally connected to the crank (15.1) for extending towards the slideway, a rocker (15.3) one end of which is pivotally connected to the coupler (15.2) and the friction member (9). The other end of a rocker (15.3) is for pivotally connected to chassis (C) of the vehicle. Chassis (C) of the vehicle will provide a fixed frame for the four-bar mechanism (15). This embodiment also comprises a bracket (16) one end of which is pivotally connected to the friction member (9) and other end of which is for pivotally connected to chassis (C) of the vehicle. The bracket (16) supports the longer friction members (9) and provides a motion only in vertical for friction members (9).

In one embodiment of the braking system (1) for slideway guided amusement vehicles which is applicable for all embodiments, preferably comprises pillow block bearings (17) for mounting the first shaft (3) and the second shaft (5) to chassis (C) of the vehicle to prevent wearing.

The invention claimed is:

1. A braking system for slideway guided amusement vehicles comprising:
   at least one brake handle;
   a first shaft fixed to the at least one brake handle for mounting spinnably and extending horizontally to a chassis of a vehicle, wherein when the at least one brake handle is pushed or pulled from a released position of the at least one brake handle, the at least one brake handle provides a torque on the first shaft;
   a first gear concentrically positioned on and free to spin independently of the first shaft;
   an actuator fixed to the first shaft for providing a linear motion to a stop pin;
   an inlet opening on the first gear for receiving the stop pin, wherein the first gear rotates with the first shaft when the stop pin is in the inlet opening;
   a second gear coupled to the first gear, concentrically fixed on a second shaft for mounting spinnably and extending horizontally to the chassis of the vehicle;
   at least one friction member attached to the second shaft for applying a braking force to a slideway when the second shaft is in a braking position;
   a tensioning means, wherein a first end of the tensioning means is for anchoring to the chassis of the vehicle, a second end of the tensioning means is attached to a tensioner block fixed to the second shaft, wherein the tensioning means apply a force to the second shaft through the tensioner block to keep the second shaft in the braking position;
   a control unit adapted to remove the stop pin from the inlet opening via the actuator when the control unit receives a braking signal from at least one electronic unit connected to the control unit,
   wherein when the stop pin is in the inlet opening and when the at least one brake handle is pulled or pushed from the released position of the at least one brake handle, a rotational movement of the first shaft is transmitted to the second shaft though the first gear and the second gear, wherein the second gear moves the tensioner block to increase a tension on the tensioning means and spins the second shaft out of the braking position where the at least one friction member is released from the slideway for making the vehicle free to move,
   wherein when the at least one brake handle is released, the second shaft is spun to the braking position of the second shaft again via a released tension on the tensioning means and the at least one friction member starts to apply the braking force to the slideway,
   when the control unit receives the braking signal from the at least one electronic unit, the stop pin is removed from the inlet opening via the actuator whereby the first gear spins free from the first shaft and the second gear and second shaft spins to the braking position and the at least one friction member starts to apply the braking force to the slideway independent from pulling or pushing or releasing of the at least one brake handle.

2. The braking system to claim 1, wherein the at least one electronic unit is a proximity sensor sending the braking signal to the control unit when the proximity sensor detects a presence of the vehicle in front at a selected distance.

3. The braking system according to claim 1, wherein the at least one electronic unit is a speed sensor sending the braking signal to the control unit when the vehicle exceeds a selected speed limit.

4. The braking system according to claim 1, wherein the at least one electronic unit is a wireless receiver sending the braking signal to the control unit when the wireless receiver receives a trigger signal wirelessly or when the braking system enters a selected zone on the slideway.

5. The braking system according to claim 1, wherein the tensioning means is a helical spring.

6. The braking system according to claim 1, comprising a support means with a collar hole for the stop pin situated on the first shaft, close to the first gear, for preventing an abaxial movement of the stop pin.

7. The braking system according to claim 6, comprising a ball bush situated on the actuator and/or the support means and/or the first gear for providing a linear guideway for the stop pin.

8. The braking system according to claim 1, wherein the tensioner block has a D shape cross-section from a linear part of the tensioner block is fixed to the second shaft from a lower end of the tensioner block, an arced part of the tensioner block has a longitudinal slit for receiving the second end of the tensioning means; the tensioner block comprises a wheel situated inside the tensioner block, attached to the second end of the tensioning means, wherein the second end of the tensioning means is free to move through the longitudinal slit via a rolling motion of the wheel on an inside surface of the arced part.

9. The braking system according to claim 8, wherein the wheel is a roller bearing.

10. The braking system according to claim 1, wherein the at least one friction member attached to the second shaft via a four-bar mechanism comprising
- a crank fixed to the second shaft,
- a coupler pivotally connected to the crank for extending towards the slideway, a rocker, wherein a first end of the rocker is pivotally connected to the coupler and the at least one friction member, and a second end of the rocket is pivotally connected to the chassis of the vehicle,
- a bracket, wherein a first end of the bracket is pivotally connected to the at least one friction member and a second end of the bracket is for pivotally connected to the chassis of the vehicle.

11. The braking system according to claim 1, comprising pillow block bearings for mounting the first shaft and the second shaft to the chassis of the vehicle.

\* \* \* \* \*